United States Patent [19]
Pyzik

[11] Patent Number: 5,182,952
[45] Date of Patent: Feb. 2, 1993

[54] PADDLEWHEEL FLOWMETER ASSEMBLY

[75] Inventor: Thomas E. Pyzik, Naugatuck, Conn.

[73] Assignee: Omega Engineering, Inc., Stamford, Conn.

[21] Appl. No.: 642,529

[22] Filed: Jan. 17, 1991

[51] Int. Cl.⁵ .............................................. G01F 15/18
[52] U.S. Cl. .................................................. 73/861.79
[58] Field of Search .......... 73/861.79, 861.81, 861.83, 73/861.87, 861.92, 187, 866.5

[56] References Cited

U.S. PATENT DOCUMENTS

| | | | |
|---|---|---|---|
| 3,496,770 | 2/1970 | Fassett II | 73/187 |
| 3,771,363 | 11/1973 | Stapler | 73/861.92 |
| 4,898,029 | 2/1990 | Boucher | 73/187 |

*Primary Examiner*—Herbert Goldstein
*Attorney, Agent, or Firm*—Bruce E. Hosmer; Howard S. Reiter

[57] ABSTRACT

An assembly for accurately and easily positioning and aligning a sensor device relative to a fluid flow stream in a pipe, incorporates a threaded housing which is engageable with a standard pipe tee-fitting to provide a platform for linearly positioning the sensor relative to the axis of flow. A sensor unit subassembly is rotatably supported on the platform so that it may be rotated into proper radial alignment with the flow axis while it is supported on the platform at the proper linear position relative to the flow axis. A paddlewheel flowmeter having a single leg supporting the paddlewheel axle in cantilever fashion forms the sensing unit which exploits the improved alignment accuracy of this assembly to avoid build-up of sludge and debris which might affect free rotation of the paddlewheel. Separate and independent lock-nuts fix the housing in position relative to the tee-fitting, and fix the sensor sub-assembly in position relative to the housing.

8 Claims, 3 Drawing Sheets

PADDLEWHEEL FLOWMETER ASSEMBLY

This invention relates generally to an assembly for positioning and aligning a sensor element relative to a fluid conduit, and more particularly relates to a paddlewheel flowmeter assembly which can be inserted into and coupled to the stem of a tee-fitting in a fluid conduit, in a wide range of different positions.

Assemblies for coupling sensor elements to fluid conduits are well-known in the metering and sensing art. In general, the related prior art devices incorporate elements of given size and configuration which are merely set into predetermined positions and then sealed against leakage of the fluid (gas or liquid) at the location where the sensing element enters the fluid conduit.

In many applications, and particularly in customized systems where the sensing elements and the conduit fittings are designed and constructed specifically for each other, it is possible to employ predetermined positions and configurations for sensor orientation, without detrimental effect.

However, for simplicity and cost effectiveness, it is desirable to provide sensor assemblies which can be coupled to standard fluid conduit fittings in a wide range of transverse positions and angular alignments relative to a given fluid flow path.

Angular alignment of a sensor relative to a fluid flow path may be a particularly important consideration where, as in the case of a flowmeter, relative movement (e.g. flow) between the sensed fluid and the sensor directly affects the sensor output readings (e.g. volume of fluid flow per unit of time). For devices such as a paddlewheel flowmeter, proper angular alignment of the paddle wheel axis of rotation, so that it is fully transverse to the axis of the fluid flow path, may be critical to proper operation and accurate readings. In such applications, the ability to adjust the angular position of the wheel axis in desired increments over a substantially infinite range of positions ca offer significant cost and operational advantages over products which either cannot be adjusted at all or which are adjustable only in set increments and/or within a limited range.

Similarly, the ability to adjust the position of a sensor in a direction transverse to the direction of fluid flow, may be critical, especially when it is desired to sense conditions at a specific distance from the central flow axis, or when the sensor must be positioned preferably on one side only of the flow axis, as with a paddle wheel flowmeter.

Accordingly, it is an object of this invention to provide a sensor assembly which can be coupled to a fluid flow path simply and efficiently in infinitely adjustable increments over a wide range of transverse linear positions and angular alignments.

It is another object of this invention to provide a sensor assembly incorporating markers to aid in aligning the assembly properly With the fluid conduit during the installation process.

It is still another object of this invention to provide a sensor assembly incorporating a paddlewheel flowmeter sensing unit of improved design which will benefit from the accurate alignment capability of this invention.

A feature of this invention is a two part assembly comprising a threaded housing which engages a threaded fitting in a fluid conduit to provide linear positioning relative to the axis of the conduit, and a sensing unit which rotatably engages the housing in fixed linear position to provide angular positioning of the sensing unit relative to the axis of the conduit.

Another feature of this invention is a paddlewheel flowmeter having a cantilevered paddlewheel axle supported at one end only by a single depending leg extending from the body of the sensing unit, which provides improved fluid flow past the paddlewheel.

These and other and further objects, features and advantages of this invention will be made apparent to those having skill in this art by the following specification and the accompanying drawings, in which.

Figure 1:
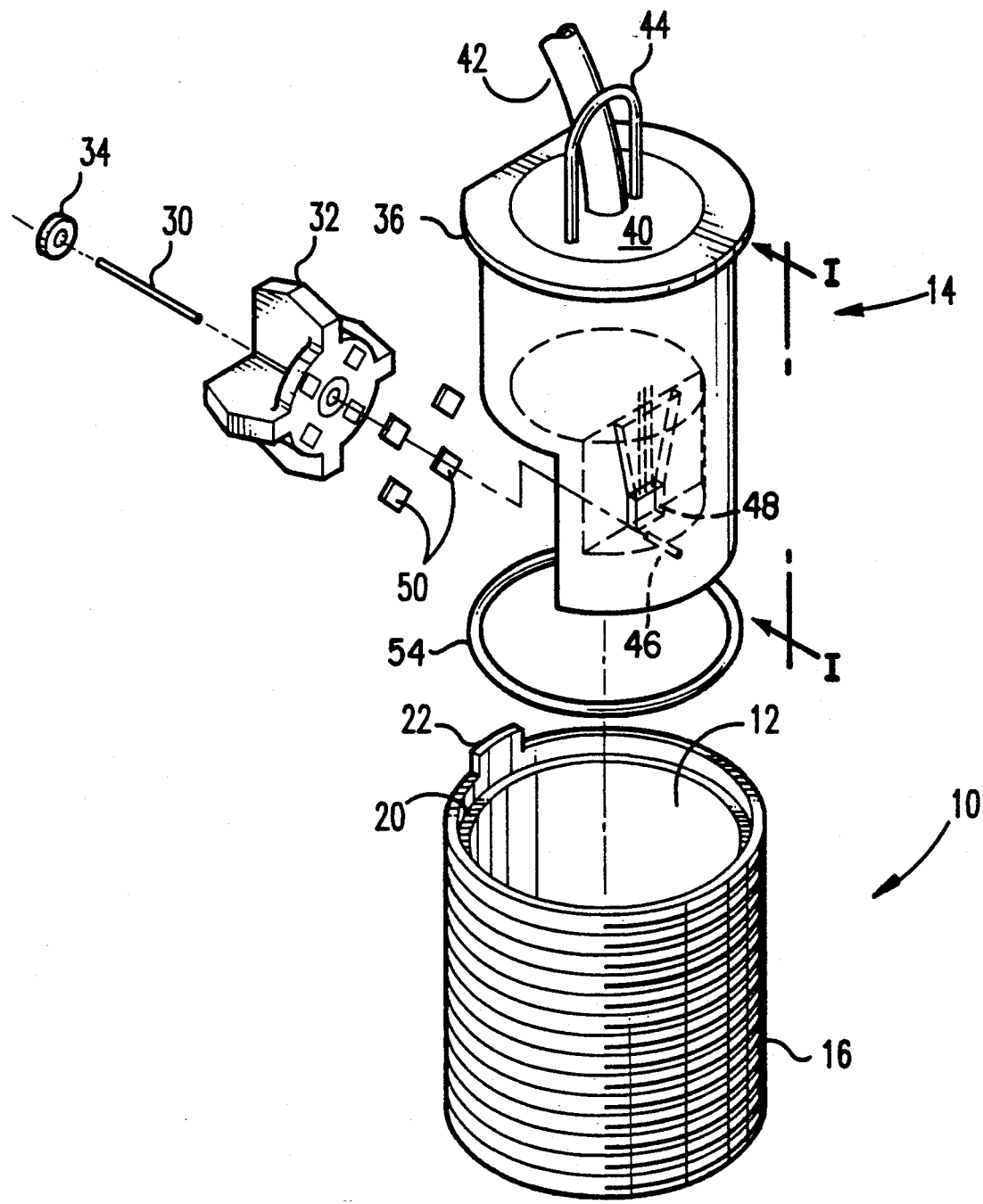
FIG. 1 is an exploded partial pictorial representation of a sensor assembly in accordance with this invention, embodying a paddlewheel flowmeter in accordance with this invention.
Figure 4:
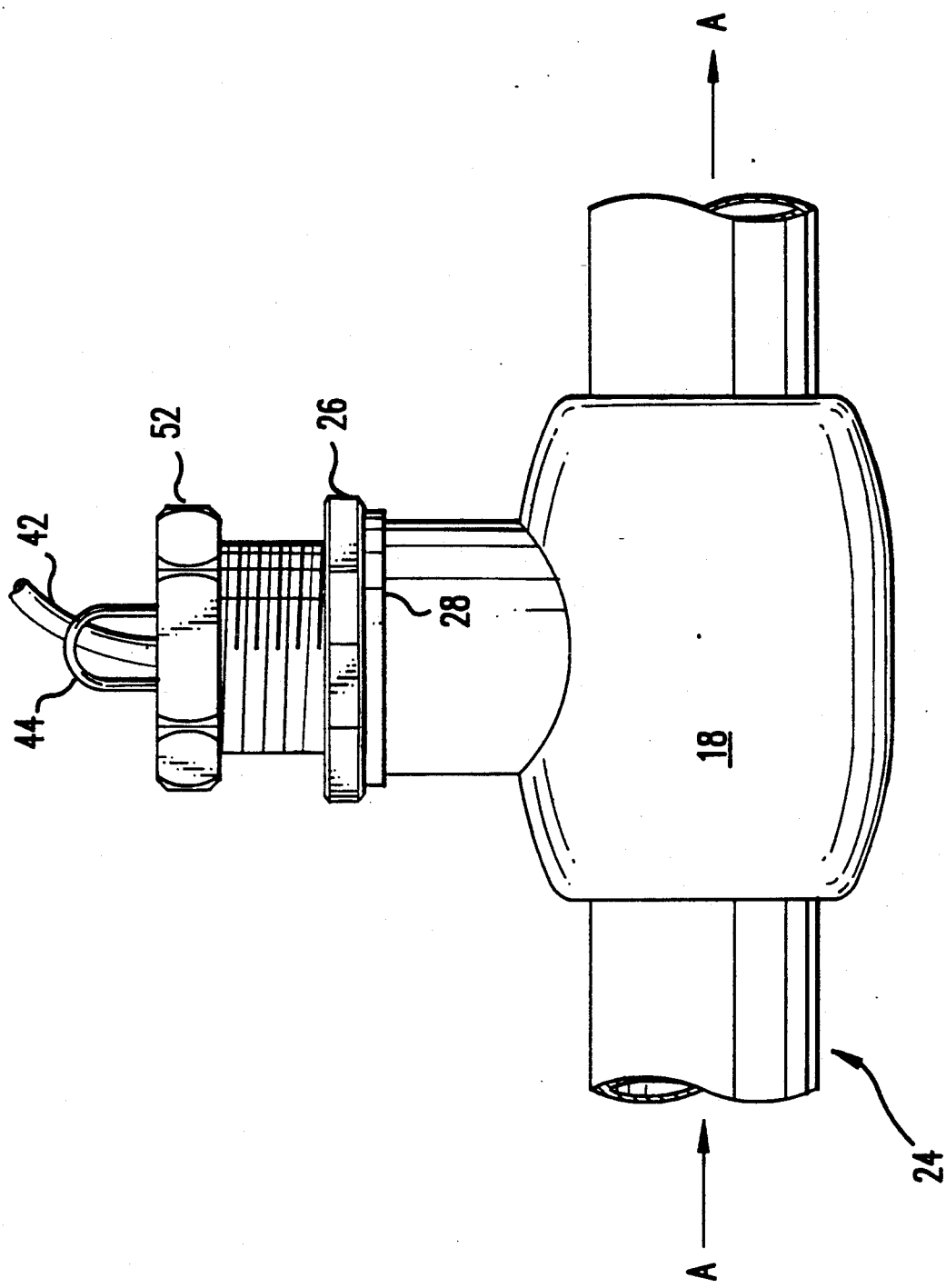
FIG. 4 is an elevation view of the sensor assembly of FIG. 1 coupled to a tee-fitting in a fluid conduit, showing the fastening and sealing members of FIG. 2 in assembled position.

Referring now more specifically to the drawings, FIG. 1 illustrates a sensor assembly comprising a cylindrical housing 10 having a central axial opening 12 for receiving a sensor body 14. Housing 10 includes a threaded outer surface 16, suitable for engaging mating threads such as standard pipe threads, in a fluid conduit fitting 18 as shown in FIG. 4. An annular internal shoulder 20 formed at one end of the housing 10 serves as a seating surface for locating sensor body 14 relative to the housing. A raised boss 22 is provided on housing 10, to serve as a visible marker for alignment relative to the axis of a fluid conduit, such as line A—A in FIG. 4, when the sensor assembly is being coupled to the conduit.

In use, housing 10 is threaded into the opening of a tee-fitting 18 in a fluid conduit 24 (shown in FIG. 4). The housing advances linearly into the fitting toward the conduit axis A—A as the threaded surface 16 is rotated relative to the mating threads (not shown) in the fitting 18. During coupling of the housing to the tee-fitting, sensor body 14 remains separate from the housing so that central axial opening 12 is open for access to the interior of fluid conduit 24 if needed. Annular internal shoulder 20 may be positioned at a precise desired linear distance from axis A—A by advancement of threads 16 until the desired distance is achieved. The distance between shoulder 20 and axis A—A may be determined readily in any well-known manner by measurements taken either externally, or internally through the access permitted by central opening 12.

Raised boss 22 on the rim of opening 12 in housing 18 serves as a visible marker which may be aligned visibly with axis A—A as the housing is being positioned relative to the conduit. If, for example, marker 22 is to be aligned parallel to axis A—A, it may be positioned on either side of the axis, so that the distance between shoulder 20 and the axis may adjusted to within one-half of the linear distance through which the housing moves during one revolution of threads 16 (i.e. the "pitch" of the threads), in a well-understood manner. If it becomes necessary or desirable to determine the linear position of shoulder 20 with even greater accuracy, one or more additional markers such as 22 may be provided at annularly spaced-apart locations, so that linear positioning can be accomplished within fractions of the pitch of the threads. To assist in distinguishing among a plurality of markers, visible distinctions such as different colors or shapes may be provided for each one.

Figure 2:
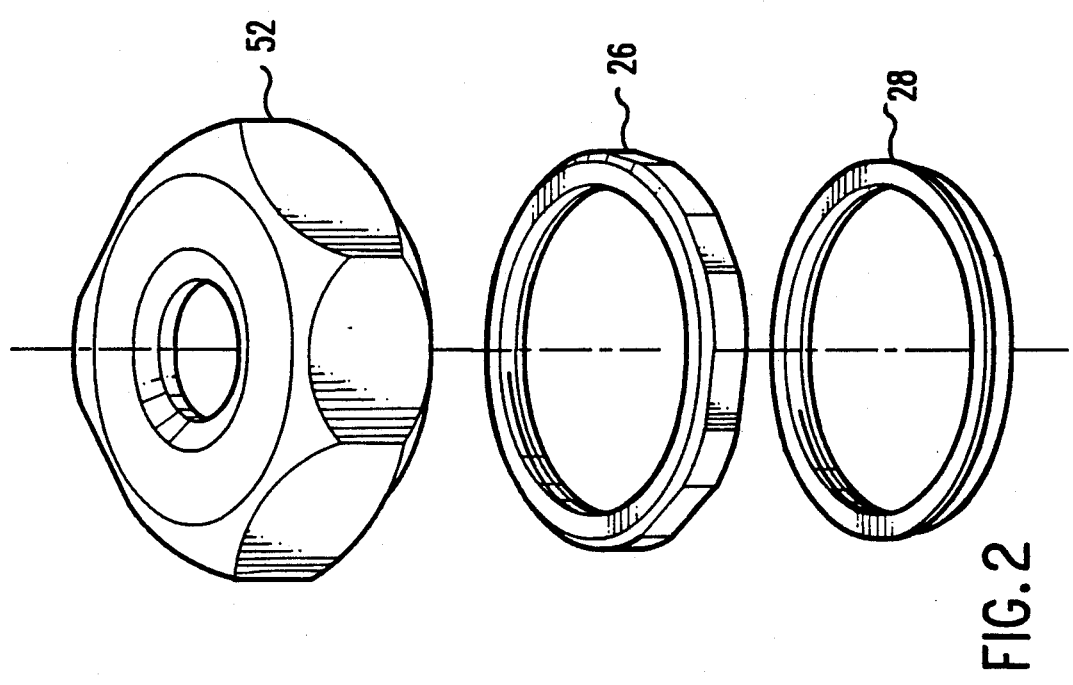
FIG. 2 is a pictorial representation of fastening and sealing members which complete the assembly of FIG. 1.

When housing 10 has been positioned in a desired location within fitting 18, it may be locked in position to prevent inadvertent displacement, by means of a jamnut 26 and a sealing ring 28 (both shown in FIG. 2), positioned as shown in FIG. 4. Sealing ring 28 is provided to prevent leakage of fluid between housing 10 and fitting 18 in a well-known manner. It should be understood that other well-known forms and methods of sealing against leakage may be employed for this purpose.

Referring again to FIG. 1 more specifically, the paddlewheel sensor unit of the illustrated embodiment of this invention may be seen to comprise a body member 14, 1 paddlewheel axle 30, a paddlewheel 32 mountable for rotation about the axle, and a retainer 34 for attachment to the axle to retain the paddlewheel in position.

Figure 3:
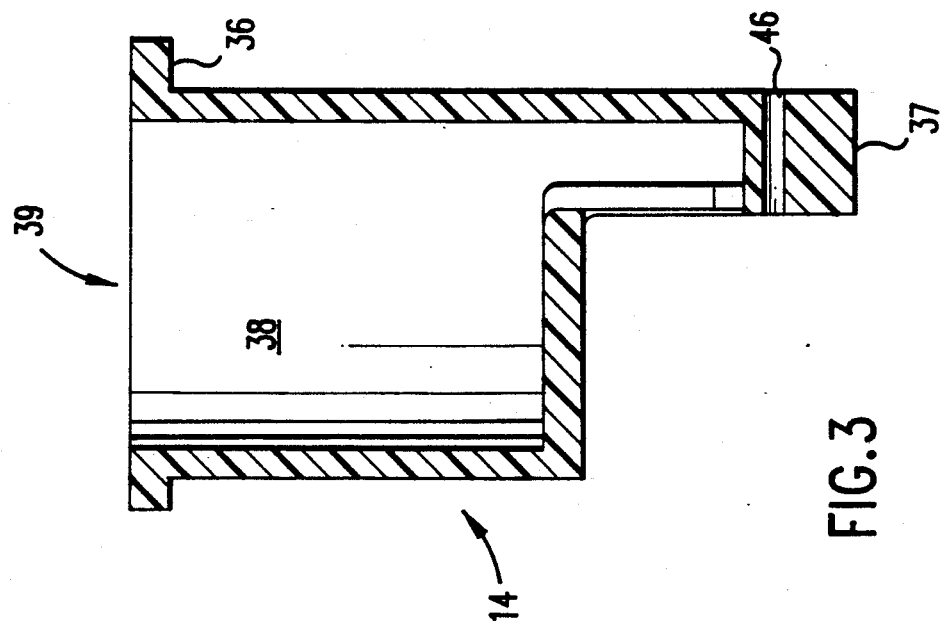
FIG. 3 is a partial cross-sectional view of the housing of the paddlewheel sensing unit illustrated in FIG. 1, taken along Line I—I.

As shown more clearly in the cross-sectional view in FIG. 3, body member 14 includes an annular exterior mating shoulder 36 at one end thereof and a single depending leg 37 extending from the other end in a generally axial direction. Mating shoulder 36 is dimensioned to abut against seating shoulder 20 on housing 10 when the body 14 is inserted into central opening 12 in the housing. Body member 14 further includes an internal chamber 38 which provides access to the interior of the body through end opening 39. A cap member 40 is provided to close end opening 39 and may be joined and sealed to the structure of the body in any well-known manner to prevent leakage of fluid through the body to the exterior. A sensor cable 42 passes through the cap 40 in sealed relation, to carry electrical signals from the interior to the exterior for reasons explained elsewhere in this specification.

A loop handle 44 is provided on cap 40 to facilitate insertion and removal of the sensor 14, and to serve as a visible marker for alignment with marker 22 on housing 10. To serve its marking function, handle 44 may be fixed in a desired position relative to body 14 at the time cap 40 is fixed to the body. It is believed to be obvious in view of this disclosure, that other and different forms of visible markers may be provided at various locations on body 14, for the purpose of aligning the body with marker 22.

The abutting surfaces of shoulders 20 and 36 slide freely relative to each other so that housing 14 may be rotated relative to the housing to bring marker-handle 44 into desired radial alignment with marker 22 after the marker 22 has been aligned in a desired position relative to fluid conduit axis A—A. Exact visible alignment of sensor 14 with axis A—A may be achieved, accordingly, even though it is not possible to view the interior of conduit 24 when body 14 is located within housing 10.

Referring again to FIG. 3, body 14 may be seen to include a transverse bore 46 near the extending end of leg 37; bore 46 is provided to receive one end of paddle wheel axle 30 and to support the axle in cantilever relation to leg 37. The axle may be received in the bore in force-fit relation or may be secured affirmatively within the bore in any suitable manner, such as by set screw, adhesive, welding, or the like. Hollow chamber 38 within body 14 may be seen to extend into the interior of depending leg 37 close to bore 46. A magnetoresponsive device such as a Hall-effect sensor element 48 is mounted within the chamber 38 in leg 37 in proximity to bore 46 where it is in position to cooperate with the paddlewheel 32 as the wheel it is in position to cooperate with the paddlewheel 32 as the wheel rotates on the axle. A plurality of magnets are mounted on the paddlewheel 32 in any suitable manner, in peripheral array about the axis of rotation, to generate an electrical signal in the sensor element 48 in the usual manner for such sensor elements, as the paddle wheel rotates on its axis. A retainer 34 in the form of a flexible washer or clip is attached to the free end of the axle to retain the paddlewheel in position after it has been mounted on the axle. In the prior art, such paddle wheels have been supported by a pair of parallel spaced-apart legs engaging both ends of an axle element; the parallel legs, forming the outer portions of a generally U-shaped structure, are believed to create a channeling effect around the paddle wheel which improves fluid flow past the wheel and compensates for slight misalignments relative to the axis of fluid flow. In the present invention, the more exact alignment achievable by the disclosed assembly eliminates the need to compensate for misalignments by channeling fluid flow. This invention takes advantage of the increased accuracy of alignment in a novel manner by supporting the axle in the manner of a cantilever beam, using only one support leg. The use of a single support leg provides additional advantages by eliminating the possibility of capturing sludge and debris between the wheel and the additional support leg, and by avoiding any increase in debris accumulation which may be caused by the channeling effect of two support legs.

When sensor body 14 has been properly aligned within housing 10, it is releasably fixed in the desired position by a cap nut 52, shown in FIGS. 3 and 4. The cap nut bears against the open end 39 of body 14, to urge shoulder 36 into firm abutting relationship with shoulder 20. If desired, a sealing ring 54 may be interposed between the two shoulders, as suggested in FIG. 1, to improve sealing and seating characteristics. The axial force exerted by cap nut 52 as it is tightened onto the outer threads 16 on housing 10 may also be used to hold cap 40 in fixed and sealing relation with body 14, if desired.

The specification and drawings herein set forth clearly and fully describe a preferred embodiment of this invention, but it should be readily apparent to those having skill in this art that other forms, embodiments and variations thereof may be conceived and constructed without departing from the spirit and scope of the following claims:

What is claimed is:

1. A linearly positionable and axially alignable sensor assembly, for separable attachment to a threaded cylindrical fitting which opens into a fluid conduit at an angle to the longitudinal axis thereof, said sensor assembly comprising:

a cylindrical housing having a cylindrical axial opening therethrough, and a threaded cylindrical surface thereon for threaded coupling with said threaded cylindrical fitting, such that said housing may be rotated so as to be advanced axially along a substantially linear path, into a desired linear position relative to the axis of the fluid conduit within said cylindrical fitting;

visible marker means on said housing alignable relative to the axis of the fluid conduit by rotation of said housing when said housing is threadedly engaged with said fitting;

said housing having an annular seating shoulder thereon for engaging and supporting a mating shoulder of a sensing unit, such that said seating shoulder may be positioned at a desired linear distance from the axis of the fluid conduit in said fitting, by threaded rotation of said housing within said fitting;

a sensing unit insertable into said cylindrical housing, and having an annular mating shoulder for engaging and seating against the seating shoulder of said cylindrical housing in any desired radial alignment position relative to said housing, when said sensing unit is inserted therein;

visible alignment means on said sensing unit alignable with said visible marker means on said housing to assure proper alignment of said sensing unit with the fluid conduit as indicated by the marker means;

fastening means engageable with said housing and said sensing unit for urging the mating shoulder of said sensing unit into engagement with the seating shoulder of said housing, to retain said unit within said housing in a desired radial alignment therewith and at a desired radial distance from the axis of the fluid conduit within said cylindrical fitting.

2. The sensor assembly of claim 1, wherein said threaded surface on said housing is formed on the exterior thereof, and said fastening means is a cap nut having an inwardly extending peripheral shoulder for engaging said sensing unit, and a threaded inner surface for mating with the threaded surface of said housing.

3. The sensor assembly of claim 1, further including coupling means on said housing engageable with a fitting into which said housing .s inserted, for engaging said fitting and fixing the position of said housing relative thereto.

4. The sensor assembly of claim 3, Wherein said threaded surface on said housing is formed on the exterior thereof, and said coupling means comprises a threaded nut threadedly engaging said threaded surface for axial movement along the length of said housing so that it may be forcibly abutted against the end of a fitting into which said housing is threaded, in the manner of a jam nut.

5. A sensor assembly in accordance with claim 1, wherein the sensor is a paddlewheel flowmeter.

6. A sensor assembly in accordance with claim 5, wherein the paddle wheel flowmeter comprises an elongate body having said annular mating shoulder located at one end thereof for engaging said annular seating shoulder, and a single axially depending leg portion at the other end thereof; said single depending leg portion having a paddlewheel axle supported thereon and extending therefrom in cantilevered relationship, with a paddle wheel rotatably mounted on said axle; and retention means on the free end of said axle for retaining said paddle wheel thereon.

7. A sensor assembly in accordance with claim 6, Wherein said paddlewheel includes magnet elements peripherally arrayed on one axial end surface thereof, and said single depending leg portion includes a magneto-responsive sensing device positioned to respond to the passage of said magnet elements as said paddlewheel rotates.

8. A linearly positionable and axially alignable sensor assembly for separable attachment to a fitting having a cylindrical bore with an inner threaded bore surface which opens into a fluid conduit at an angle to the longitudinal axis thereof, comprising:

a cylindrical housing having a cylindrical axial opening therethrough, and a threaded outer surface for mating with the threaded bore surface of said fitting, such that said housing may be advanced axially along a substantially linear path into a desired linear position relative to said fitting;

visible marker means on said housing alignable relative to the axis of the fluid conduit by rotation of said housing when said housing is threaded into said fitting;

said housing having an annular seating shoulder thereon at one end of said cylindrical axial opening for engaging and supporting a mating shoulder of a sensing unit;

a sensing unit in the form of a paddle wheel flowmeter insertable into said cylindrical housing, said sensing unit comprising an elongate body having an annular mating shoulder located at one end thereof for engaging and seating against said annular seating shoulder of said cylindrical housing in relatively rotatable relationship therewith. and a single axially depending leg portion at the other end thereof: said single depending leg portion having a paddlewheel axle supported thereon and extending therefrom in cantilevered relationship, with a paddlewheel rotatably mounted on said axle, and retention means on the free end of said axle for retaining said paddle wheel thereon;

at least one magnet element positioned on one axial end surface of said paddle wheel, and a magneto-responsive sensing device mounted on said single depending leg portion and positioned to respond to the passage of said magnet element as said paddlewheel rotates about said axle;

visible alignment means on said paddlewheel flowmeter sensing unit alignable with said visible marker means on said housing to assure proper alignment of said sensing unit with the fluid conduit as indicated by the marker means;

fastening means engageable with said housing and said sensing unit for urging the mating shoulder of said sensing unit into engagement with the seating shoulder of said housing, to retain said unit within said housing in a desired radial alignment therewith; and coupling means on said housing engageable with a fitting into which said housing is inserted, for engaging said fitting and fixing the position of said housing relative thereto;

said coupling means comprising a threaded nut threadedly engaging said threaded surface for axial movement along the length of said housing so that it may be forcibly abutted against the end of a fitting into which said housing is threaded, in the manner of a jam nut.

* * * * *